United States Patent
Capoldi et al.

(10) Patent No.: US 10,400,823 B2
(45) Date of Patent: Sep. 3, 2019

(54) CAGE SEGMENT, SEGMENTED CAGE, AND BEARING

(71) Applicant: Aktiebolaget SKF, Gothenburg (SE)

(72) Inventors: Bruno Capoldi, Charentenay (FR); Vincent Bredoire, Pourrain (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/865,960

(22) Filed: Jan. 9, 2018

(65) Prior Publication Data

US 2018/0209480 A1    Jul. 26, 2018

(30) Foreign Application Priority Data

Jan. 26, 2017    (DE) .................. 10 2017 201 237

(51) Int. Cl.

| | |
|---|---|
| *F16C 33/51* | (2006.01) |
| *F16C 19/24* | (2006.01) |
| *F16C 33/46* | (2006.01) |
| *F16C 19/30* | (2006.01) |
| *F16C 33/48* | (2006.01) |

(Continued)

(52) U.S. Cl.
CPC ............ *F16C 33/513* (2013.01); *F16C 19/24* (2013.01); *F16C 19/305* (2013.01);
(Continued)

(58) Field of Classification Search
CPC .... F16C 19/26; F16C 19/305; F16C 33/4635; F16C 33/4676; F16C 33/56; F16C 33/513;
(Continued)

(56) References Cited

U.S. PATENT DOCUMENTS

| | | | | |
|---|---|---|---|---|
| 1,239,547 | A * | 9/1917 | Webb ...................... | F16C 19/50 |
| | | | | 384/598 |
| 2,959,458 | A * | 11/1960 | Kaye ...................... | F16C 33/49 |
| | | | | 384/608 |

(Continued)

FOREIGN PATENT DOCUMENTS

| | | | | |
|---|---|---|---|---|
| DE | 102006022951 | A1 * | 11/2007 | ............. F16C 19/34 |
| DE | 102010015085 | A1 * | 11/2011 | ............. F16C 33/56 |

(Continued)

*Primary Examiner* — Marcus Charles
(74) *Attorney, Agent, or Firm* — Bryan Peckjian; SKF USA Inc. Patent Dept.

(57) ABSTRACT

A cage segment for a bearing rotatable around an axis being able to receive a plurality of rolling elements configured to travel on two annular raceways respectively on inner and outer rings of the bearing, and including an inner wall that extends circumferentially in the form of a cylinder, the axis of symmetry being the axis (X1), an outer wall that extends circumferentially in the form of a cylinder, the axis of symmetry being the axis (X1), two end portions that are circumferentially opposed, which extend radially with respect to the axis (X1) and which connect together the inner wall and the outer wall, a plurality of successive pockets for receiving the rolling elements, so that two successive pockets are circumferentially delimited by a radial beam, The radial beam extending radially with respect to the axis (X1), the radial beam comprising two end portions so that one end portion connects with the inner wall and the other end portion connects with the outer wall, The radial beam provides a first recess that extends axially with respect to the axis (X1).

8 Claims, 6 Drawing Sheets

(51) Int. Cl.
*F16C 33/66* (2006.01)
*F16C 19/38* (2006.01)

(52) U.S. Cl.
CPC ...... *F16C 33/4676* (2013.01); *F16C 33/4682* (2013.01); *F16C 33/48* (2013.01); *F16C 19/30* (2013.01); *F16C 19/381* (2013.01); *F16C 33/4635* (2013.01); *F16C 33/6614* (2013.01); *F16C 33/6651* (2013.01); *F16C 2208/10* (2013.01); *F16C 2220/04* (2013.01); *F16C 2300/14* (2013.01)

(58) Field of Classification Search
CPC ................ F16C 33/4682; F16C 33/583; F16C 33/4617; F16C 2208/10; F16C 2300/14; F16C 19/24; F16C 19/30; F16C 19/381; F16C 33/48; F16C 33/6614; F16C 33/6651; F16C 2220/04
USPC ....... 384/513, 548, 560–561, 569, 572, 578, 384/593, 623
See application file for complete search history.

(56) References Cited

U.S. PATENT DOCUMENTS

| | | | | |
|---|---|---|---|---|
| 4,413,866 | A | * | 11/1983 | Geisey ............... F16C 19/30 384/572 |
| 8,950,945 | B2 | * | 2/2015 | Bouron ............... F16C 19/38 384/455 |
| 9,664,231 | B2 | * | 5/2017 | Omoto ............... F16C 33/56 |
| 2010/0002973 | A1 | * | 1/2010 | Omoto ............... F16C 33/513 384/548 |

FOREIGN PATENT DOCUMENTS

| | | | | |
|---|---|---|---|---|
| EP | 1408248 A2 | * | 4/2004 | ............ F16C 33/513 |
| EP | 2610508 A1 | * | 7/2013 | ............ F16C 19/386 |
| EP | 2610511 A1 | * | 7/2013 | ............ F16C 33/4605 |
| EP | 2610512 A1 | * | 7/2013 | ............ F16C 19/386 |
| EP | 2664807 A2 | * | 11/2013 | ............ F16C 33/4605 |
| EP | 3121467 A1 | * | 1/2017 | ............ F16C 33/513 |
| JP | 2013036510 A | * | 2/2013 | ............ F16C 33/513 |
| JP | 2014139474 A | * | 7/2014 | ............ F16C 33/4635 |
| WO | WO-2016050713 A1 | * | 4/2016 | ............ F16C 33/502 |

* cited by examiner

CAGE SEGMENT, SEGMENTED CAGE, AND BEARING

CROSS-REFERENCE

This application claims priority to German patent application no. 102017201237.4 filed on Jan. 26, 2017, the contents of which are fully incorporated herein by reference.

TECHNOLOGICAL FIELD

The present invention relates to the field of bearings including rolling elements and spacing cages for maintaining these rolling elements. More particularly, the invention relates to a cage segment, to a segmented cage, and to a rolling bearing.

BACKGROUND

Particularly in the field of large-diameter bearings, for example large-diameter rolling bearings such as slewing bearings adapted to be used in wind turbines, tunnel boring machines, cranes, ladle turret, marine thrusters, stacker reclaimer, it is known to use segmented cages which comprise segments abutting circumferentially and having pockets for receiving the rolling elements. Each segment comprises a plurality of adjacent pockets, each pocket receiving one or several rolling elements.

Currently, the segments with pockets receiving each several rolling elements are metallic and made from typically from brass. The segments with pockets receiving each only one rolling element are metallic (brass) or made from synthetic material.

These segments are massive and heavy, in particular the ones made from metal.

These segments can be obtained by different several manufacturing processes, including molding, injection molding, sand molding or machining.

Injection molding is the preferred manufacturing process for the segments made from synthetic material, but due to the large dimensions of the segments and their current geometry, it is not easy to inject synthetic material uniformly in the mold. Moreover, due to different desired geometrical thicknesses of portions of the segment, it is not easy to fully fill in the space in the mold with viscous hot synthetic material, and unfortunately sometimes bubbles of air are trapped in the segment, which degrades its mechanical properties. Also, still because of different geometrical thicknesses of portions of the segment, the shrinkage occurring during the cooling of the injected material is not uniform and lead to deformation of the segment or even sometimes its breakage.

The above situations induce scraps and untimely deteriorations and are not satisfying.

SUMMARY

According to one aspect of the invention, one embodiment, it is proposed a cage segment for a bearing rotatable around an axis and able to receive a plurality of rolling elements meant to travel on two annular raceways of respectively an inner ring and an outer ring of the bearing.

The cage segment comprises an inner wall and an outer wall which both extend circumferentially in the form of a portion of cylinder, the axis of symmetry of which being the axis of the bearing.

The cage segment also comprises two end portions which are circumferentially opposed and which extend radially with respect to the axis, for connecting the inner and outer walls.

The cage segment further comprises a plurality of successive pockets for receiving the rolling elements, so that two successive pockets are circumferentially delimitated by a radial beam which extends radially with respect to the axis, the radial beam comprising two end portions so that one end portion connects with the inner wall and the other end portion connects with the outer wall.

The radial beam comprises a first recess which extends axially with respect to the axis.

According to further aspects of the invention which are advantageous but not compulsory, such a stand may incorporate one or several of the following features:

The first recess is made through the radial beam so as to face the annular raceways;

The first recess has, in the circumferential direction, a thickness which is not constant radially and which increases from the inner wall to the outer wall;

The inner and outer walls of the segment comprise second recesses;

Each end portion of the segment comprises a third recess;

The third recess has, in the circumferential direction, a thickness which is not constant radially and which increases from the inner wall to the outer wall;

The cage segment is made from a synthetic material and obtained from injection molding;

The cage segment further comprises a circumferential beam which is, in the circumferential direction, parallel to the inner and outer walls.

According to another aspect of the invention, a segmented cage for a bearing, comprises at least two successive segments according to the invention, each being able to receive at least one rolling element.

According to another aspect of the invention, a rolling bearing comprises a plurality of rings, rolling elements interposed between the rings and, for receiving the rolling elements, at least one of the cage segment or segmented cage according to the invention.

BRIEF DESCRIPTION OF THE DRAWINGS

The present invention and its advantages will be better understood by studying a bearing with a segmented cage, given by way of non-limiting example and illustrated by the appended drawings on which.

DETAILED DESCRIPTION

Figure 1:
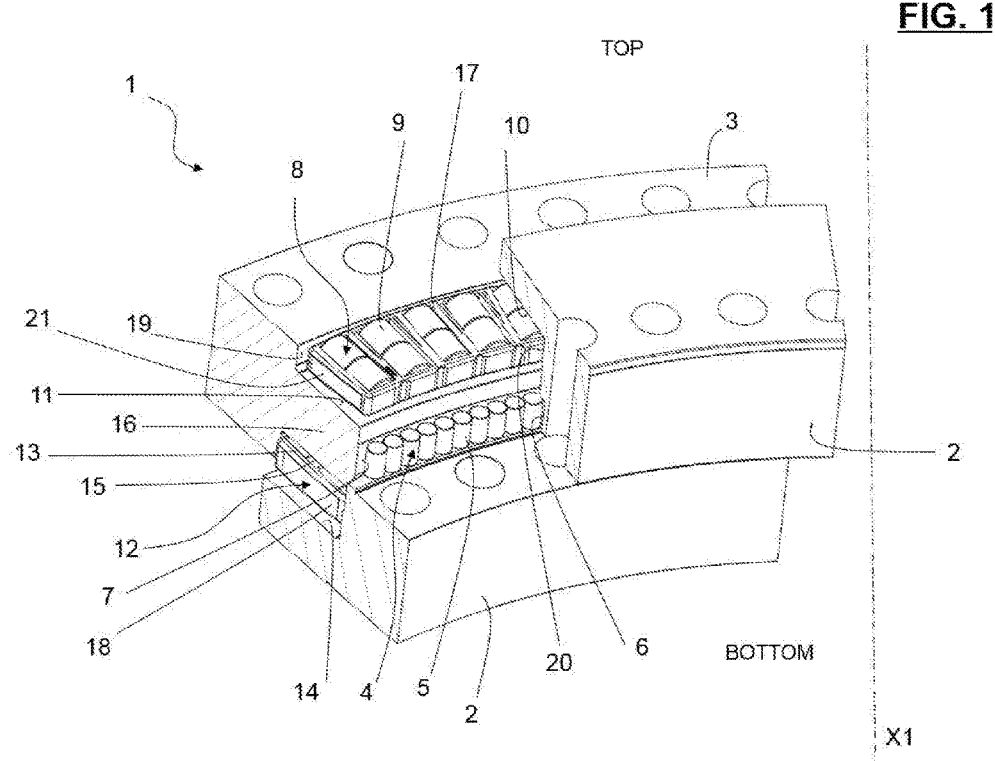
FIG. 1 is a perspective view in an axial cross-section of a bearing according to the invention and comprising two segmented cages, each segmented cage being according to the invention.

As illustrated on FIG. 1, a bearing 1 comprises an inner ring 2 and an outer ring 3 which are concentric and rotatable about an axis X1. The inner ring 2 is made of two parts. Axis X1 is disposed vertically, that is to say in a direction parallel to the gravity field, so as to define a top area TOP above the bearing, and a bottom area BOTTOM underneath the bearing.

The rings 2 and 3 are connected for example through several rows of rolling elements which will now be described.

For supporting radial loads, the bearing 1 comprises a row 4 of rolling elements 5 such as rollers, which are provided between raceways 6 and 7 of the rings 2 and 3 respectively. The raceways 6 and 7 are cylindrical. The raceways 6 and 7 are spaced apart radially. The raceway 6 belongs to the inner ring 2, and the raceway 7 belongs to the outer ring 3.

For supporting axial loads, from TOP to BOTTOM, the bearing 1 comprising a top row 8 of rolling elements 9 such as rollers, which are provided between two annular radial raceways 10 and 11 of the rings 2 and 3 respectively. The raceways 10 and 11 are planar and axially spaced apart with respect to the axis X1. The rolling elements 9 are meant to travel on the annular radial raceways 10, 11.

For supporting axial loads, from BOTTOM to TOP, the bearing 1 comprising a bottom row 12 of rolling elements 13 such as rollers, which are provided between two annular radial raceways 14 and 15 of the rings 2 and 3 respectively. The raceways 14 and 15 are planar and axially spaced apart with respect to the axis X1.

The outer ring 3 comprises a radially inner annular portion 16 comprising two axially spaced apart faces which extend radially and where the raceways 10 and 11 are arranged respectively. The radially inner annular portion 16 further comprises a inner face which extends axially and where the raceway 7 is arranged.

The rolling elements 9 of the row 8 are identical and maintained spaced apart by a cage 17.

The rolling elements 13 of the row 12 are identical and maintained spaced apart by a cage 18.

The cages 17 and 18 are centered on the central axis X1.

In the illustrated embodiment of FIG. 1, the cages 17 and 18 are identical, and the rolling elements 9 and 13 are identical.

In what follows, one of these cages is going to be described in details.

The cage 17 is disposed between cylindrical surfaces 19 and 20 of respectively the outer ring 3 and the inner ring 2. The cylindrical surfaces 19 and 20 delimit radially the space in which the rolling elements 9 are travelling. The cylindrical surfaces 19 and 20 have the axis X1 as axis of symmetry.

The cage 17 is segmented and is constituted by a plurality of cage segments or segments 21. Advantageously, the segments 21 are adjacent and identical.

The cage 17 extends circumferentially over an angle equals to 360°.

Each segment 21 is made from synthetic material such as plastic such as PA66, or metallic material such as bronze alloy.

Each segment 21 is obtained from molding, for instance injection molding or sand molding.

In the illustrated embodiments of the invention, the segment is made from injection molding of a synthetic material.

Each segment 21 comprises an inner wall 22 which extends circumferentially in the form of a portion of cylinder. The axis of symmetry of this portion of cylinder is the axis X1.

Each segment 21 also comprises an outer wall 23 which also extends circumferentially and in the form of a portion of cylinder. The axis of symmetry of this portion of cylinder is also the axis X1.

The inner wall 22 comprises an inner cylindrical face 22A which faces the cylindrical surface 20 of the inner ring 2, and the outer wall 23 comprises an outer circumferential cylindrical face 23A which faces the cylindrical surface 19 of the outer ring 3.

Each segment 21 further has two end portions 24 and 25 which are opposite circumferentially and which extend radially with respect to the axis X1. The end portions 24 and 25 connect the inner wall 22 and the outer wall 23.

Each end portion 24, 25 comprises respectively an end face 24A, 25A. When the bearing 1 is in the assembled state, that is to say when the segments 21 constituting the cage 17 are in place and adjacent circumferentially, each end face 24A, 25A of a segment 21 is abutting circumferentially the end face 24A, 25A of an adjacent segment 21.

Figure 3:
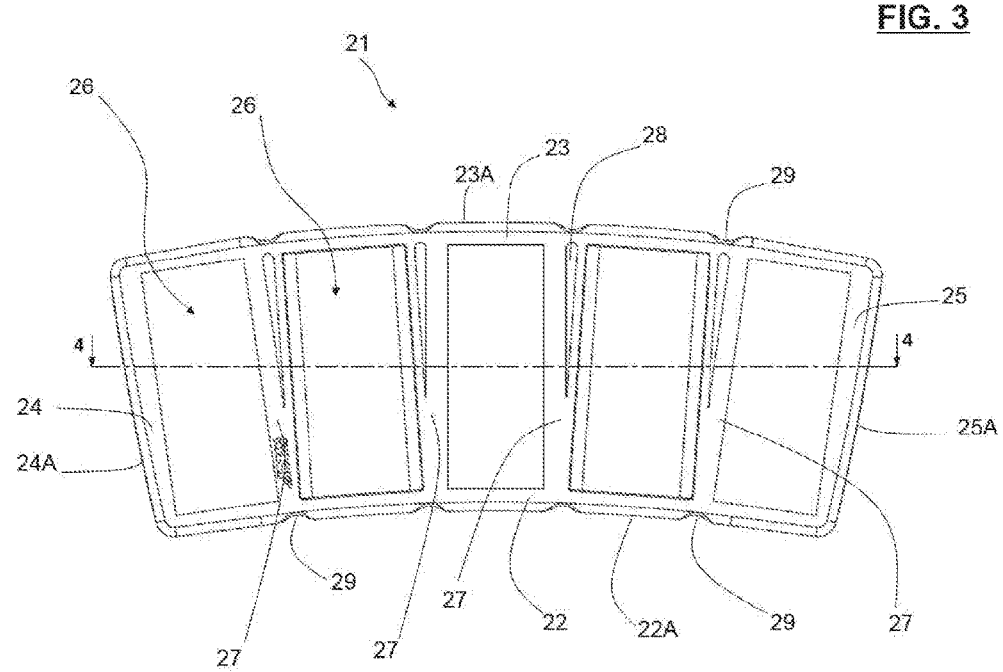
FIG. 3 is a top view of the cage segment of FIG. 2.

Furthermore, as illustrated on FIG. 3, the end faces 24A and 25A of each segment 21 have the shape of convex cylindrical shapes having axial axis parallel to the axis of the bearing 1 or the cage 17, or equivalent shapes, such that the end faces 24A and 25A of two successive adjacent segments are abutting only along an axial contact line, in order to minimize the friction within the cage 17.

Each segment 21 is provided with axially transverse pockets 26 receiving respectively some or all the rolling elements 9 of the row 8. In the embodiment illustrated on FIGS. 1 and 2, each pocket 26 receives two rolling elements 9.

The pockets 26 are circumferentially delimited by radial beams 27 which extend radially with respect to the axis X1. Each radial beam 27 has two end portions so that one end portion connects with the inner wall 23 and the other end portion connects with the outer wall 24. Each radial beam 27 has, in the circumferential direction, a thickness T.

The thickness T of the radial beam 27 is not constant radially, and increases from the inner wall 22 to the outer wall 23. This is unavoidable in order to make sure that the rolling elements 9, if identical, then have the same clearance or available space inside their respective pockets 26.

The radial beam 27 has a maximum thickness value designated as T max.

Figure 2:
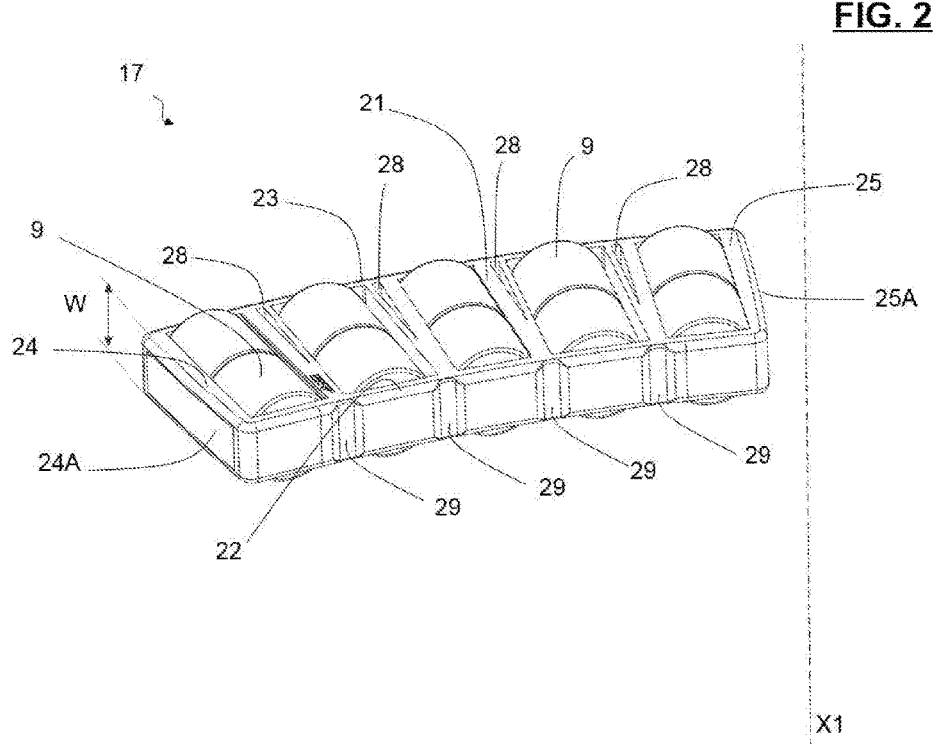
FIG. 2 is a perspective view of a first embodiment of a cage segment according to the invention, the cage segment being equipped with rolling elements.
Figure 4:
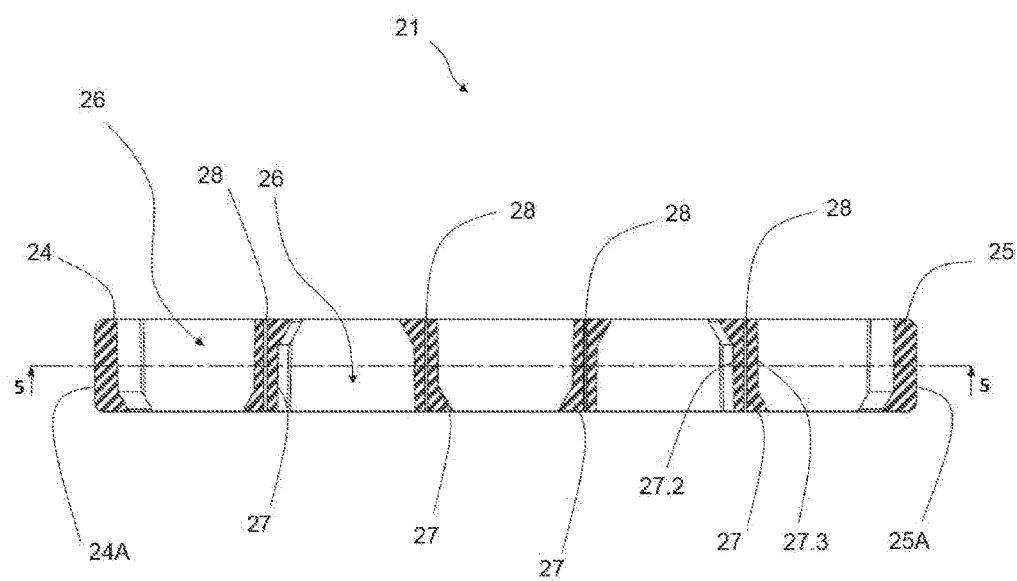
FIG. 4 is a cross section of the cage segment of FIG. 3 along 4-4.
Figure 5:
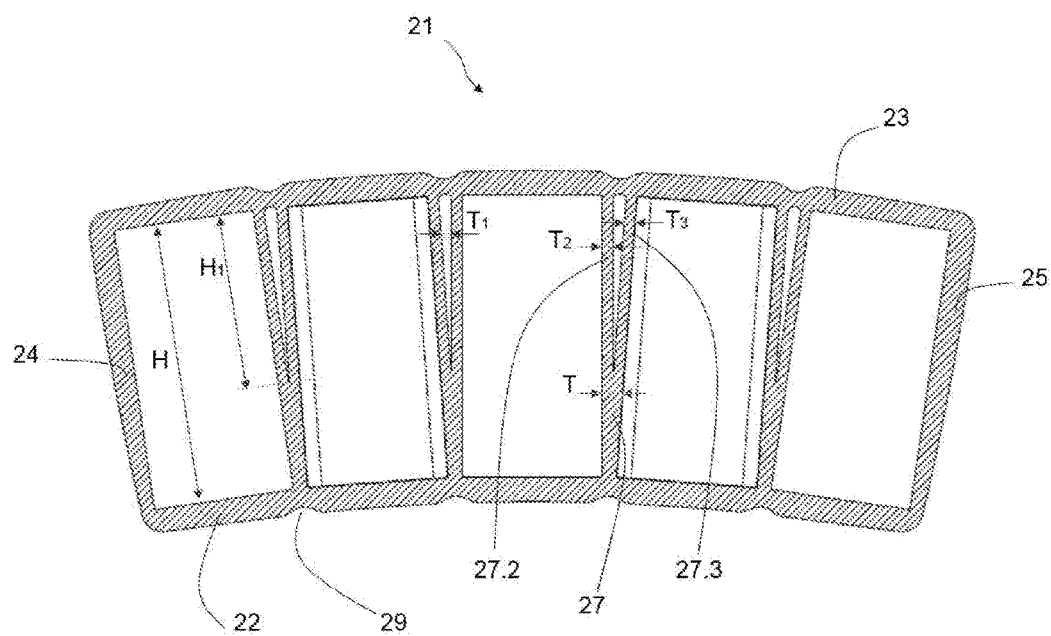
FIG. 5 is a cross section of the cage segment of FIGS. 3 and 4 along 5-5.

As illustrated on FIGS. 2, 3 and 4, each radial beam 27 comprises a first recess 28.

The first recess 28 extends axially with respect to the axis X1.

The first recess 28 is made through the radial beam 27 so as to face the annular radial raceways 10 and 11.

The first recess 28 has, in the circumferential direction, a thickness T1. The thickness T1 of the first recess 28 is not constant radially, and increases from the inner wall 22 to the outer wall 23.

Preferably, the thickness T of the beam 27 and the thickness T1 of the first recess 28 both increase linearly.

Also, in order to improve the injection of the synthetic material during the manufacturing of the segment 21, without jeopardizing the mechanical properties of the segment once in use, it is important that:

$T1 <= T\max/3$

For manufacturing feasibility reason, it is recommended to arrange first recesses 28 in the radial beam 27 of the segment 21 only if T max is superior or equal to 15 mm.

In the segment 21, the radial distance between the inner wall 22 and the outer wall 23 is designated by the reference H. Preferably, H is constant over the entire segment 21. The radial distance H also corresponds to the radial dimension of the pocket 26.

The first recess 28 has a radial dimension which is designated by the reference H1.

The first recess 28 can extend over the entire radial length of the radial beam 27, but, in order to improve the injection of the synthetic material during the manufacturing of the segment 21, without jeopardizing the mechanical properties of the segment once in use, it is however recommended that:

$$H/3 <= H1 <= 2H/3$$

Over its height H1, the first recess 28 delimits, in the circumferential direction, two portions 27.2 and 27.3 of the radial beam 27. The portions 27.2 and 27.3 have, in the circumferential direction, respectively a thickness T2 and T3.

In order to ensure an efficient molding of the synthetic material, the thicknesses T2 and T3 are constant and equal.

Moreover, the inner wall 22 and the outer wall 23 of the segment 21 comprise second recesses 29. There is a second recess 29 at the junction between the inner wall 22 and each radial beam 27, and there is a second recess 29 at a junction between the outer wall 23 and each radial beam 27.

Second recesses 29 are arranged on the inner face 22A of the inner wall 22 and on the outer face 23A of the outer wall 23, so as to face the cylindrical raceways 19 and 20 of respectively the outer ring 3 and the inner ring 2.

Each second recess 29 is blind i.e. not made through a thickness of the segment 21.

Each second recess 29 is distinct from a first recess 28, and there is no fluidic communication possible between a first recess 28 and a second recess 29.

Each second recess 29 is aligned radially with a first recess 28.

Figure 6:
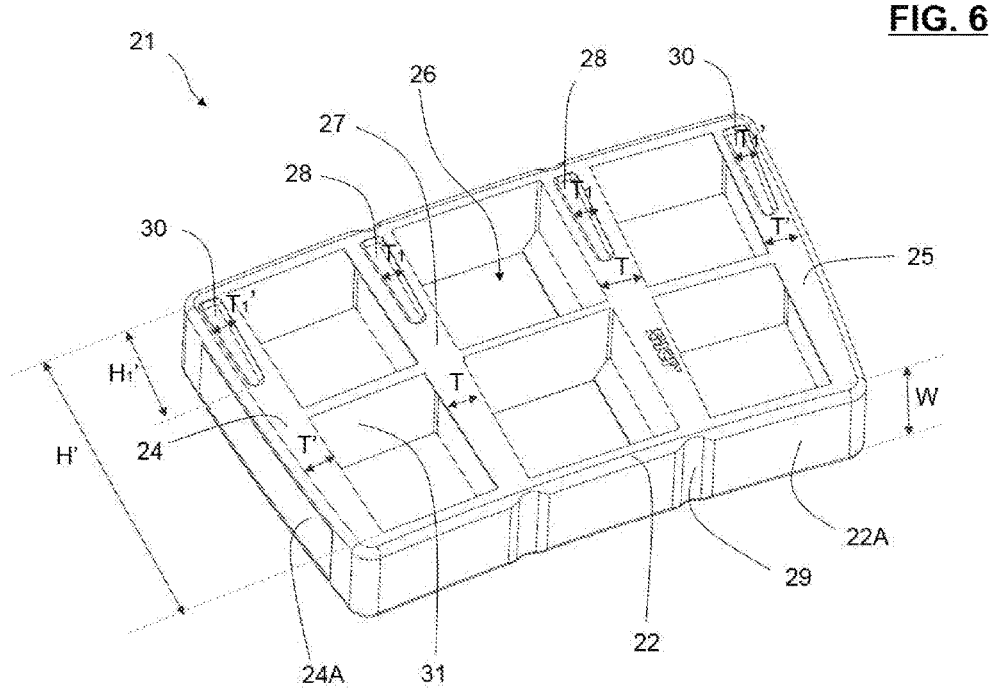
FIG. 6 is a perspective view of a second embodiment of a cage according to the invention.

FIG. 6 illustrates another embodiment of the invention where, for the sake of simplicity and clarity, the same elements as illustrated on FIGS. 1 to 5 bear the same numeral references.

Each of the two end portions 24 and 25 of the segment 21 has, in the circumferential direction, a thickness T'. The thickness T' of each end portion 24, 25 is not constant radially, increases from the inner wall 23 to the outer wall 24, and has a maximum value T max'.

Each of the two end portions 24 and 25 of the segment 21 comprises a third recess 30.

The third recess 30 is similar to the first recess 28 of each radial beam 27.

The third recess 30 has, in the circumferential direction, a thickness T1'. The thickness T1' of the third recess 30 is not constant radially, and increases from the inner wall 22 to the outer wall 23.

The thickness T' of each end portion 24, 25 and the thickness T1' of the third recess 30 both increase linearly.

The third recess 28 is made through the radial beam 27 so as to face the annular radial raceways 10 and 11.

It is important that: $T1' <= T\,max'/3$.

There are third recesses 30 only if T max' is superior or equal to 15 mm.

The third recess 30 has a radial dimension which is designated by the reference H1'.

The third recess 30 can extend over the entire radial length of the end portion 24, 25 of radial beam 27, but, in order to improve the injection of the synthetic material during the manufacturing of the segment 21, without jeopardizing the mechanical properties of the segment once in use, it is however recommended that:

$$H/3 <= H1' <= 2H/3$$

Furthermore, still for the embodiment illustrated on FIG. 6, each pocket 26 is divided-up into two sub-pockets delimitated by a circumferential beam 31 so that each sub-pocket comprises a single rolling element 9. Each circumferential beam 31 is, in the circumferential direction, parallel to the inner wall 22 and the outer wall 23 of the segment 21.

For the illustrated embodiments of the invention, the axial dimension of the segment 21 is designated as the width W of the segment.

The width W of the segment is constant.

In case the width W of the segment is of the same order of magnitude of the thickness T of the radial beam 27, it is not necessary to make the first recesses 28 and the third recesses 30 through holes, and can therefore be blind.

Thanks to the first, second and third recesses, taken individually or in combination among each other, the manufacturing of a segment obtained from molding a hot material is improved because:

The cooling time of the molded segment is reduced because there is less material to cool down and the surface in contact with the ambient atmosphere larger.

There is no more or reduced plastic deformation of the segment during its shrinkage which is unavoidable when it cools down.

Thanks to the circumferential beams 31, the segment 21 is more rigid.

Also, the circumferential beams 31 offer more injection points for the material to be injected, and therefore the injection process can be made more reliable and faster.

Each circumferential beam 31 may also comprise advantageously recesses similar the first 28 and the third 30 recesses.

Another advantage of the recesses is that they constitute additional reservoirs for a lubricant to lubricate the contact between the rolling elements and their respective raceways.

Another advantage of the recesses is that they render the cage segment and the segmented cage lighter with respect to the same segment or cage without recesses. Less material is used to manufacture the cage or segment, which also induces a significant cost saving.

Also, the recesses can be advantageously used to locate other devices such as sensors to monitor the condition of the bearing.

The present invention has been described regarding a segmented cage comprising a plurality of cage segments. The present invention can also be applied to a segmented cage comprising a single cage segment.

The present invention has been described regarding a segmented cage extending circumferentially over an angle equals 360°. The present invention can also be applied to a segmented cage extending circumferentially over an angle smaller than 360°.

The present invention has been described regarding a segmented cage receiving the rolling elements of a thrust row of a bearing for supporting primarily axial loads. The present invention can also be applied to a cage receiving the rolling elements of a bearing for supporting primarily radial loads thanks to at least one radial row.

The present invention has been described with a segment having a plurality of pockets or sub-pockets receiving each one or two rolling elements. The present invention can also be applied to a cage having segments each receiving a plurality of pockets or sub-pockets with, in each pocket or sub-pocket, at least three rolling elements.

The present invention bas been described with a segmented cage made of identical cage segments. The present invention can also be applied with segments constituting a segmented cage being different, for instance with segments with different number of pockets or different circumferential dimensions.

The present invention bas been described with a segment for rolling elements meant to travel on two annular radial raceways of respectively an inner ring and an outer ring of a bearing. The present invention can also be applied to a segment for rolling elements meant to travel on two annular axial raceways.

Also, the rolling elements maintained by the segments of the same row can be different, i.e. of different dimensions.

NOMENCLATURE

TOP
BOTTOM
X1 axis
T, T max, T1, T2, T3, T', T max', T1' thickness
W width
H,H1 radial height
1 bearing
2 inner ring
3 outer ring
4, 8, 12 row
5, 9, 13 rolling element
6, 7, 10, 11, 14, 15 raceway
16 annular portion
17, 18 cage
19, 20 cylindrical surface
21 cage segment or segment
22 inner wall
22A inner face
23 outer wall
23A outer face
24, 25 end portion
24A, 25A end face
26 pocket
27 radial beam
27.2, 27.3 portion
28 first recess
29 second recess
30 third recess
31 circumferential beam

What is claimed is:

1. A cage segment for a bearing rotatable around an axis (X1), the cage segment being able to receive a plurality of rolling elements configured to travel on two annular raceways on respectively, an inner ring and an outer ring of the bearing, and comprising:
    an inner wall that extends circumferentially in the form of a cylinder, the axis of symmetry of the inner wall being the axis (X1),
    an outer wall that extends circumferentially in the form of a cylinder, the axis of symmetry of the outer wall being the axis (X1),
    two end portions that are circumferentially opposed, which extend radially with respect to the axis (X1) and which connect together the inner wall and the outer wall,
    a plurality of successive pockets for receiving the rolling elements, so that two successive pockets are circumferentially delimited by a radial beam,
    the radial beam extending radially with respect to the axis (X1) and extending from the inner wall to the outer wall,
    the radial beam comprising two end portions so that one end portion connects with the inner wall and the other end portion connects with the outer wall, wherein
    the radial beam comprises a first recess that extends axially with respect to the axis (X1), wherein the two end portions of the cage segment are configured such that the cage segment is not connectable to a second cage segment during use and instead is configured for abutting contact only,
    a circumferential beam extending between the two end portions such that a plurality of sub-pockets are formed in each of the successive pockets, the plurality of sub-pockets being configured such that the rolling elements therein are aligned end-to-end along a direction perpendicular to the axis (X1).

2. The cage segment according to claim 1, wherein the first recess is made through the radial beam so as to face the annular raceways.

3. The cage segment according to claim 1, wherein the first recess has, in the circumferential direction, a thickness that is not constant radially and increases from the inner wall to the outer wall.

4. The cage segment according to claim 1, wherein the inner wall and the outer wall of the segment comprise second recesses.

5. The cage segment according to claim 1, wherein each end portion of the segment comprises a third recess.

6. The cage segment according to claim 5, wherein the third recess has, in the circumferential direction, a thickness (T1') that is not constant radially and which increases from the inner wall to the outer wall of the segment.

7. The cage segment according to claim 1, further comprising being made from a synthetic material and obtained from injection molding.

8. The cage segment according to claim 1, further comprises a circumferential beam that is, in the circumferential direction, parallel to the inner wall and the outer wall of the segment.

* * * * *